(12) United States Patent
Jung et al.

(10) Patent No.: US 10,927,830 B2
(45) Date of Patent: Feb. 23, 2021

(54) APPARATUS FOR CONTROLLING LINEAR COMPRESSOR AND CONTROL METHOD OF APPARATUS FOR CONTROLLING LINEAR COMPRESSOR

(71) Applicant: LG ELECTRONICS INC., Seoul (KR)

(72) Inventors: Kyunghoon Jung, Seoul (KR); Sungho Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/292,859

(22) Filed: Mar. 5, 2019

(65) Prior Publication Data

US 2019/0271302 A1    Sep. 5, 2019

(30) Foreign Application Priority Data

Mar. 5, 2018    (KR) .................. 10-2018-0025825

(51) Int. Cl.
| | |
|---|---|
| F04B 49/06 | (2006.01) |
| F04B 39/12 | (2006.01) |
| H02P 27/08 | (2006.01) |
| H02P 6/20 | (2016.01) |
| H02P 23/00 | (2016.01) |
| H02P 23/06 | (2016.01) |

(52) U.S. Cl.
CPC ............ *F04B 49/06* (2013.01); *F04B 39/121* (2013.01); *H02P 6/20* (2013.01); *H02P 23/0027* (2013.01); *H02P 23/06* (2013.01); *H02P 27/085* (2013.01); *F04B 2203/0401* (2013.01); *F04B 2203/0402* (2013.01); *F25B 2400/073* (2013.01)

(58) Field of Classification Search
CPC .......... H02P 27/08; H02P 21/22; H02P 27/06; H02P 27/085; H02P 6/20; H02P 23/0027; H02P 23/06; H02P 23/26; F04B 49/06; F04B 2203/0401; F04B 2203/0202; F04B 39/121

See application file for complete search history.

(56) References Cited

U.S. PATENT DOCUMENTS

| | | | | |
|---|---|---|---|---|
| 5,225,759 | A | * | 7/1993 | Endo .................... H02P 6/21 318/400.38 |
| 5,587,891 | A | * | 12/1996 | Nakata ................ B60L 9/22 363/41 |
| 5,616,993 | A | * | 4/1997 | Lu ...................... H02P 6/08 318/400.09 |

(Continued)

FOREIGN PATENT DOCUMENTS

| | | |
|---|---|---|
| JP | 2015047022 | 3/2015 |
| KR | 1020030093929 | 12/2003 |

OTHER PUBLICATIONS

Extended European Search Report in European Application No. 19160515.3, dated May 28, 2019, 9 pages.

(Continued)

*Primary Examiner* — Thai T Dinh
(74) *Attorney, Agent, or Firm* — Fish & Richardson P.C.

(57) ABSTRACT

The present disclosure relates to a compressor control apparatus and a compressor control method thereof, and more particularly, to a compressor control apparatus for controlling a switching operation of a switching device to control the start-up of a compressor motor and a compressor control method thereof.

13 Claims, 9 Drawing Sheets

(56) References Cited

U.S. PATENT DOCUMENTS

| | | | | |
|---|---|---|---|---|
| 5,808,440 | A * | 9/1998 | Bennett | G11B 19/20 |
| | | | | 318/139 |
| 6,710,573 | B2 * | 3/2004 | Kadah | H02M 7/53871 |
| | | | | 318/268 |
| 6,972,539 | B1 * | 12/2005 | Codilian | G11B 19/28 |
| | | | | 318/432 |
| 9,093,944 | B2 * | 7/2015 | Kim | H02P 27/08 |
| 9,729,099 | B1 | 8/2017 | Lovas et al. | |
| 2003/0169013 | A1 * | 9/2003 | Kadah | H02M 7/53871 |
| | | | | 318/727 |
| 2007/0152624 | A1 * | 7/2007 | Hamaoka | H02P 6/182 |
| | | | | 318/805 |
| 2016/0248365 | A1 * | 8/2016 | Ishizeki | H02M 1/36 |
| 2017/0302200 | A1 * | 10/2017 | Marcinkiewicz | H02M 1/32 |
| 2018/0191288 | A1 * | 7/2018 | Li | H02P 6/06 |
| 2018/0259583 | A1 * | 9/2018 | Jung | H02M 1/4233 |

OTHER PUBLICATIONS

Wilson, Dave, "So, which PWM technique is best? (Part 3)," Motion Products Evangelist, Texas Instruments, Apr. 5, 2012, pp. 1-6, XP055590157.

Wilson, Dave, "So, which PWM technique is best? (Part 4)," Motion Products Evangelist, Texas Instruments, Apr. 10, 2012, pp. 1-7, XP055590160.

Kim, Myunggyu, "Bipolar-Starting and Unipolar-Running Method to Drive a Brushless DC motor at High Speed with Large Starting Torque," Graduate School, Hanyang University, Nov. 3, 2003, 58 pages.

\* cited by examiner

MINIMUM DUTY FIXED

APPARATUS FOR CONTROLLING LINEAR COMPRESSOR AND CONTROL METHOD OF APPARATUS FOR CONTROLLING LINEAR COMPRESSOR

CROSS-REFERENCE TO RELATED APPLICATIONS

The present disclosure relates to subject matter contained in priority Korean Application No. 10-2018-0025825, filed on Mar. 5, 2018, which is herein expressly incorporated by reference in its entirety.

BACKGROUND OF THE INVENTION

1. Field of the Invention

The present disclosure relates to a compressor control apparatus and a compressor control method thereof, and more particularly, to a compressor control apparatus for controlling start-up of a compressor motor and a compressor control method thereof.

2. Description of the Conventional Art

A compressor or compressor motor is applied to various electronic devices. An electronic device mounted with a compressor is provided with an inverter for controlling the operation of the compressor motor.

The inverter converts an AC voltage to a DC voltage and switches the converted DC voltage according to a PWM (Pulse Width Modulation) signal to generate an AC voltage. The AC voltage generated by the inverter is transferred to a load and used, and an AC voltage with user's desired voltage and frequency may be supplied to the load to control the driving of the load in a precise manner. PWM control using the PWM signal generally controls the inverter using a unipolar PWM switching scheme. The unipolar switching scheme controls a switching device of the inverter to operate using a unipolar switching scheme by outputting a PWM signal in a unipolar manner, and has less switching loss compared to a bipolar PWM switching scheme, and generally used in controlling the motor of the compressor. In other words, when controlled in a bipolar switching manner, there is a problem that efficiency is rapidly lowered due to switching loss, and thus the inverter is generally controlled in a unipolar switching manner.

On the other hand, a control apparatus of the compressor or a control apparatus of the inverter may sense current flowing through the motor to control the motor. Specifically, the control apparatus of the compressor or the control apparatus of the inverter may sense current flowing through the motor using a shunt resistor disposed between the inverter and an input power source. A method of sensing current flowing through the motor using a shunt resistor does not require the use of an expensive sensor, and thus widely used in the control apparatus of the compressor. However, in the case of using a shunt resistor, the switching device operates in a unipolar switching manner when controlled in the unipolar switching manner, and current flows only during PWN-ON, and there is limit that the sensing of motor current is not easily carried out. In particular, during initial start-up in which voltage applied to the motor is insufficient, smaller current is sensed, and there is a problem that motor current is not accurately sensed through the shunt resistor. This leads to a problem that the stability and reliability of motor control are deteriorated.

Furthermore, there is a problem that a switch of the inverter must operate at a predetermined duty ratio value or more to sense current using the shunt resistor. For this purpose, a minimum duty ratio value is set to perform switching control so as to maintain the minimum duty ratio value. However, in such a case, the voltage of a DC link capacitor becomes unstable due to a minimum duty ratio value during initial start-up of the motor, thereby causing a problem that the estimation of motor voltage is not accurately carried out.

In other words, motor voltage and a duty ratio of the switch are not sufficient during initial start-up of the compressor, thereby causing a problem that motor current cannot be accurately sensed. Accordingly, there is a problem that the compressor may be driven in an unstable operating state during initial start-up.

SUMMARY OF THE INVENTION

The task of the present disclosure is to improve the limitations of the related art, and therefore, an object of the present disclosure is to provide a compressor control apparatus capable of accurately sensing a motor current during start-up control of a compressor motor, and a compressor control method thereof.

Furthermore, another object of the present disclosure is to provide a compressor control apparatus capable of securing stability and reliability during start-up control by accurately sensing a motor current during start-up control, and a compressor control method thereof.

In addition, still another object of the present disclosure is to provide a compressor control apparatus capable of improving the constraint of voltage instability according to minimum duty ratio setting of a PWM control signal for controlling the inverter, and a compressor control method thereof.

In order to solve the foregoing task of the present disclosure, a compressor control apparatus and a compressor control method thereof disclosed herein is technically characterized in that the switching operation of an inverter that supplies driving power to a compressor motor is controlled in a bipolar switching mode or a unipolar switching mode according to the start-up state of the motor.

Specifically, the switching operation of a switching device of the inverter is controlled in a bipolar switching mode when a motor current applied to the motor is sensed to be less than a predetermined amount (sensible amount), and the switching operation of the switching device is controlled in a unipolar switching mode when the motor current is sensed to be above the predetermined amount.

When the motor current is sensed to be less than the predetermined amount as described above, it is controlled in the bipolar switching mode to increase the amount of sensing the motor current, and thus the motor current may be sensed to be above the predetermined amount.

In other words, a compressor control apparatus and a compressor control method disclosed herein provides a technical feature in which the switching operation control of the switching device is switched according to the start-up state of the motor, as a problem-solving means.

An embodiment of a compressor control apparatus disclosed herein that provides the technical feature as a problem-solving means may include an input unit connected to an external power source to convert AC power input from the external power source to DC power, an inverter unit including a plurality of switching devices connected to the input unit and a motor of a compressor to convert the DC power to driving power to be applied to the motor and apply the driving power to the motor, a sensing unit connected between the input unit and the inverter unit to sense a motor current applied to the motor, and a control unit configured to sense the motor current from the sensing unit to generate a pulse width modulation (PWM) control signal for controlling the operation of the switching devices based on a sensing result, and apply the control signal to the switching devices so as to control the operation of the switching devices, wherein the control unit controls the operation of the switching devices in a bipolar PWM switching mode or a unipolar PWM switching mode according to the start-up state of the motor.

Furthermore, an embodiment of a compressor control apparatus disclosed herein that provides the technical feature as a problem-solving means may include applying the driving power to the motor to start the motor, controlling the operation of the switching device in a bipolar PWM switching mode during a preset reference time period, and controlling the operation of the switching device in a bipolar PWM switching mode or a unipolar PWM switching mode according to the start-up state of the motor subsequent to the reference time period.

For an embodiment of a compressor control apparatus disclosed herein that provides the technical feature as a problem-solving means, the operation of the switching device may be controlled in a bipolar switching mode or a unipolar switching mode according to whether or not the motor is initially started.

For instance, the operation of the switching device may be controlled in a bipolar switching mode when the motor corresponds to an initial start-up, and the operation of the switching device may be controlled in a unipolar switching mode when the initial start-up of the motor is completed.

Furthermore, the operation of the switching device may be controlled in the bipolar switching mode or the unipolar switching mode according to the sensed amount of the motor current of the motor.

For instance, the operation of the switching device may be controlled in the bipolar switching mode when the motor current is sensed to be less than a preset reference current which is a selection criterion of the bipolar switching mode or the unipolar switching mode, and the operation of the switching device may be controlled in the unipolar switching mode when sensed above the reference current.

Furthermore, the operation of the switching device may be controlled in the bipolar switching mode or the unipolar switching mode according to a motor voltage applied to the motor.

For instance, the operation of the switching device may be controlled in the bipolar switching mode when the motor current is sensed to be less than a preset reference voltage which is a selection criterion of the bipolar switching mode or the unipolar switching mode, and the operation of the switching device may be controlled in the unipolar switching mode when sensed above the reference voltage.

The compressor control apparatus and the compressor control method disclosed herein may improve the limitations of the related art through the foregoing problem-solving means.

In other words, the switching operation control of the switching device may be switched according to the start-up state of the motor, thereby solving the foregoing task.

Specifically, the compressor control apparatus and the compressor control method disclosed herein may control the switching operation of the switching device in a bipolar switching mode or a unipolar switching mode according to the start-up state of the motor, thereby having an effect capable of appropriately and efficiently performing the operation control of the switching device.

In particular, the operation of the switching device may be controlled in a bipolar switching mode during initial start-up of the motor to sense motor current in a sensible amount, thereby having an effect capable of accurately and easily performing the sensing of the motor current even during the initial start-up.

Accordingly, stability and reliability during start-up control may be secured, and accurate sensing of the motor current may be also carried out throughout the motor control, thereby having an effect capable of accurately performing the control of the motor.

Furthermore, the operation of the switching device may be controlled in a bipolar switching mode during initial start-up of the motor, thereby having an effect capable of improving the constraint of voltage instability according to minimum duty ratio setting of a PWM control signal for controlling the inverter.

Moreover, the operation of the switching device may be controlled in a unipolar switching mode subsequent to the completion of the initial start-up of the motor, thereby having an effect capable of reducing unnecessary switching loss due to the switching operation of the switching device.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Here, a compressor control apparatus and a compressor control method thereof disclosed herein will be described in detail with reference to the accompanying drawings, and it should be noted that technological terms used herein are merely used to describe a specific embodiment, but are not intended to limit the spirit of technologies disclosed herein.

Furthermore, unless particularly defined otherwise, technological terms used herein should be construed as a meaning that is generally understood by those having ordinary skill in the art disclosed herein, and should not be construed too broadly or too narrowly.

Furthermore, in describing technologies disclosed herein, the detailed description will be omitted when specific description for publicly known technologies disclosed herein is judged to obscure the gist of the present invention, and it should be noted that the accompanying drawings are merely illustrated to easily explain the concept of the invention, and therefore, they should not be construed to limit the technological concept disclosed herein by the accompanying drawings.

[Compressor Control Apparatus]

First, an embodiment of a compressor control apparatus disclosed herein will be described with reference to FIGS. 1 through 14.

Figure 1:
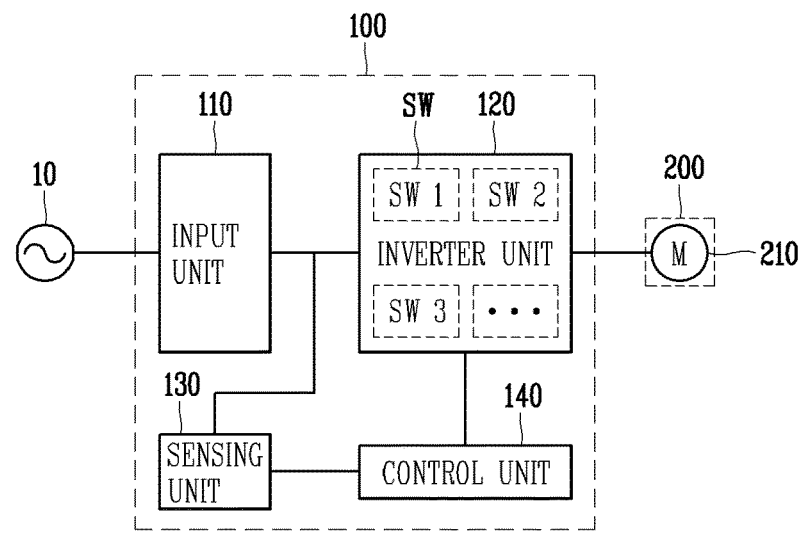
FIG. 1 is a configuration view showing a configuration of a compressor control apparatus disclosed herein.

FIG. 1 is a configuration view showing a configuration of a compressor control apparatus disclosed herein.

Figure 2:
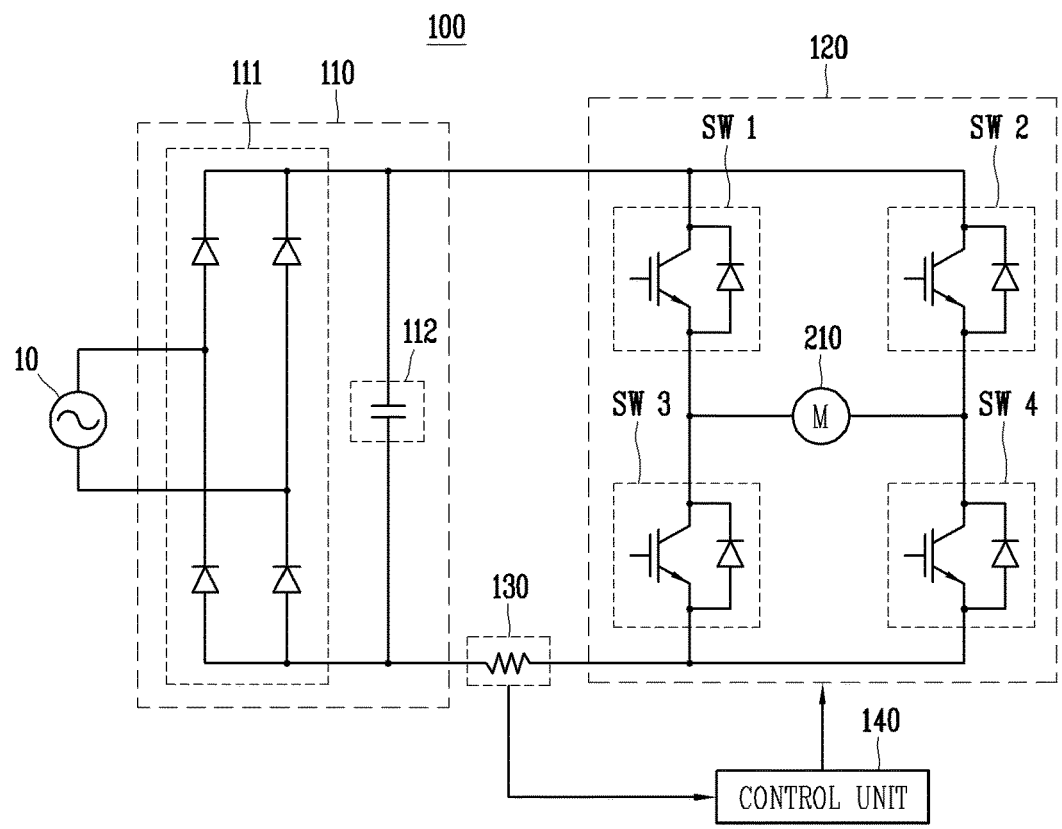
FIG. 2 is a configuration view showing a specific circuit configuration of a compressor control apparatus disclosed herein.

FIG. 2 is a configuration view showing a specific circuit configuration of a compressor control apparatus as illustrated in FIG. 1.

Figure 3:
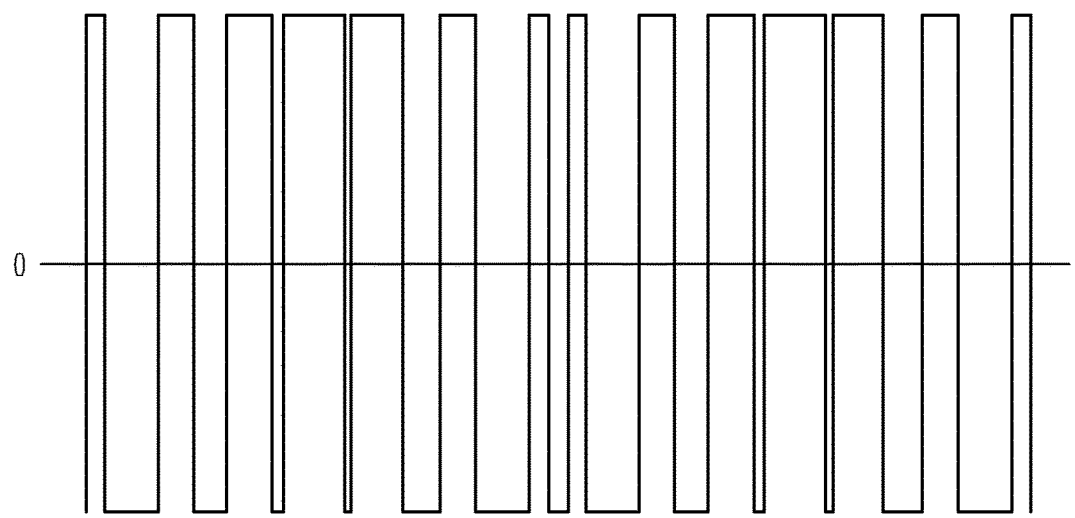
FIG. 3 is an exemplary view showing a waveform of a PWM control signal according to a bipolar switching mode.

FIG. 3 is an exemplary view showing a waveform of a PWM control signal according to a bipolar switching mode.

Figure 4:
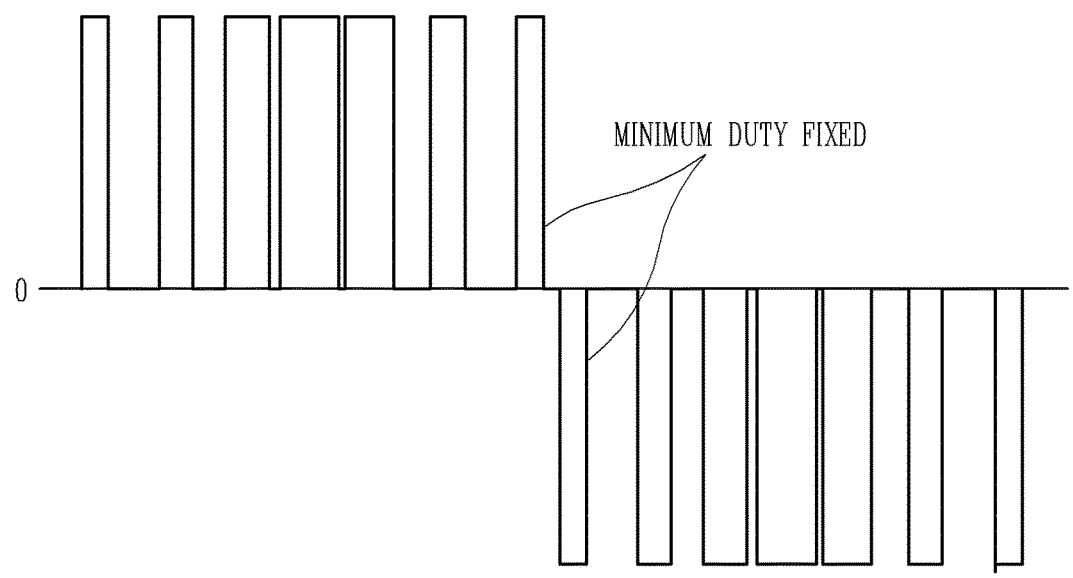
FIG. 4 is an exemplary view showing a waveform of a PWM control signal according to a unipolar switching mode.

FIG. 4 is an exemplary view showing a waveform of a PWM control signal according to a unipolar switching mode.

Figure 5:
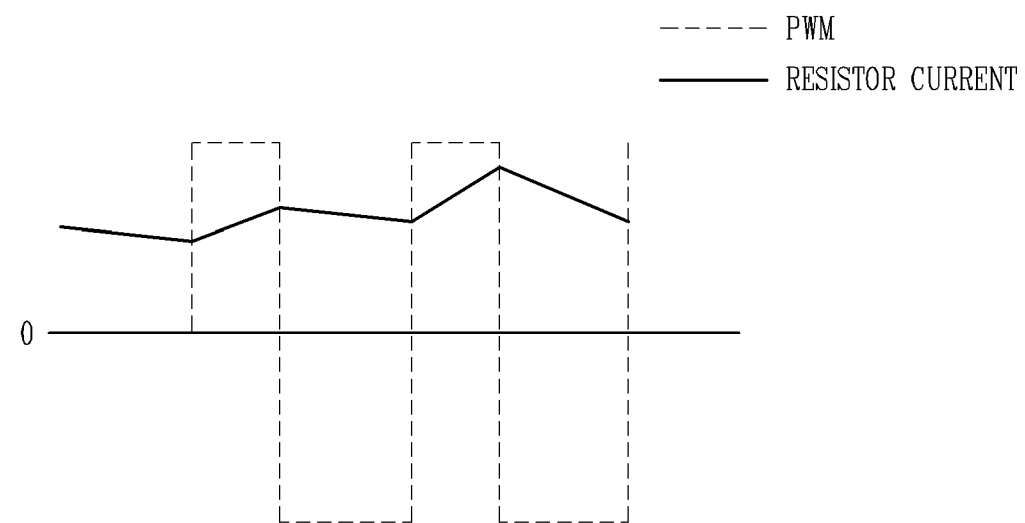
FIG. 5 is an exemplary view showing an example of a sensing result of a motor current according to a bipolar switching mode.

FIG. 5 is an exemplary view showing an example of a sensing result of a motor current according to a PWM control signal as illustrated in FIG. 3.

Figure 6:
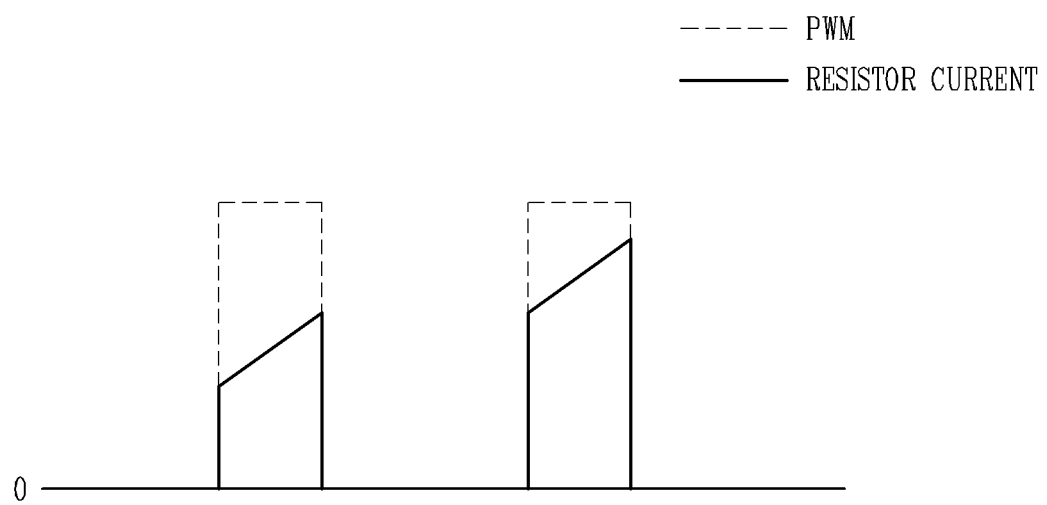
FIG. 6 is an exemplary view showing an example of a sensing result of a motor current according to a unipolar switching mode.

FIG. 6 is an exemplary view showing an example of a sensing result of a motor current according to a PWM control signal as illustrated in FIG. 4.

Figure 7:
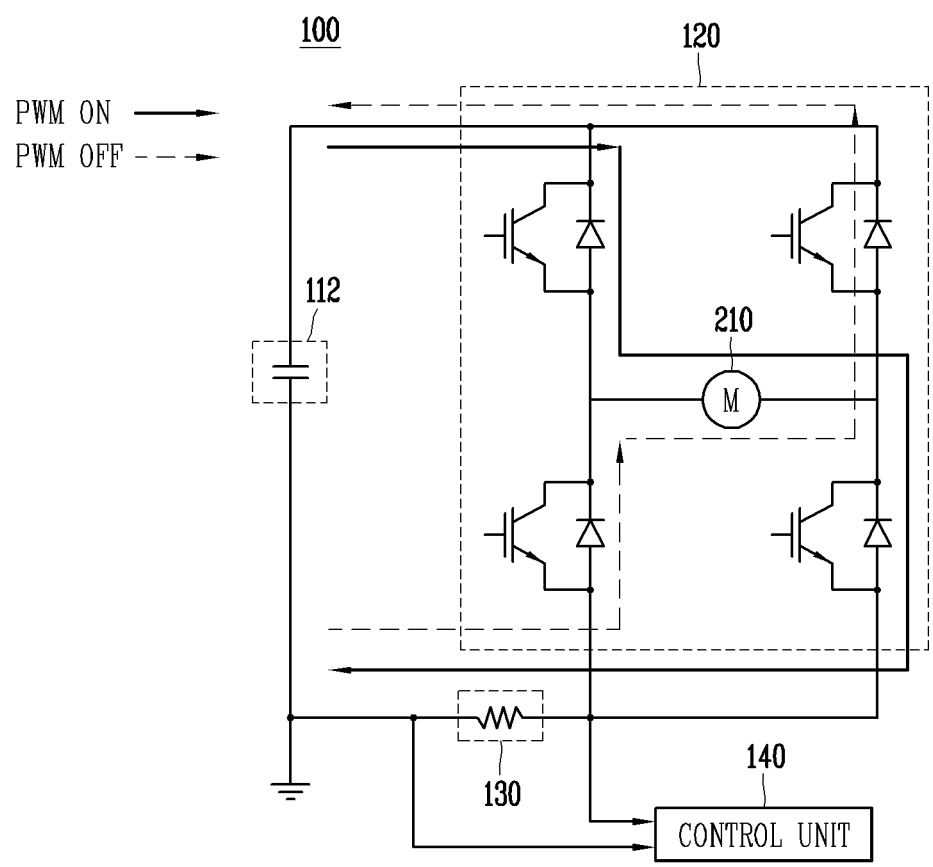
FIG. 7 is an exemplary view showing a flow of current according to a bipolar switching mode.

FIG. 7 is an exemplary view showing a flow of current according to a bipolar switching mode.

Figure 8:
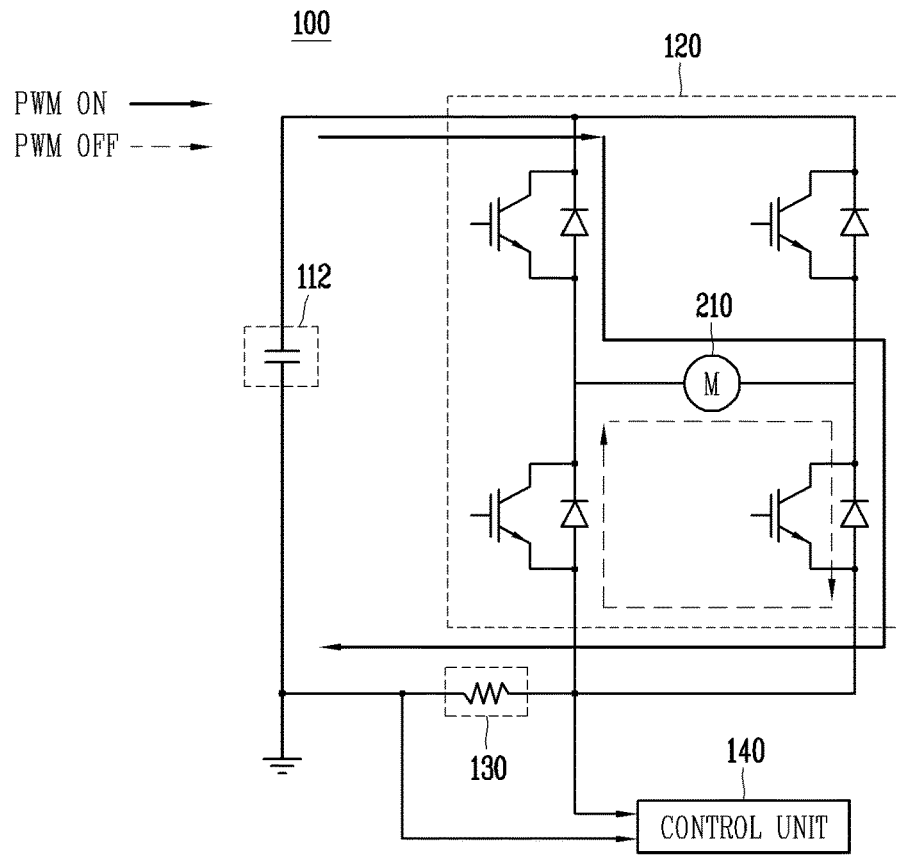
FIG. 8 is an exemplary view showing a flow of current according to a unipolar switching mode.

FIG. 8 is an exemplary view showing a flow of current according to a bipolar switching mode.

Figure 9:
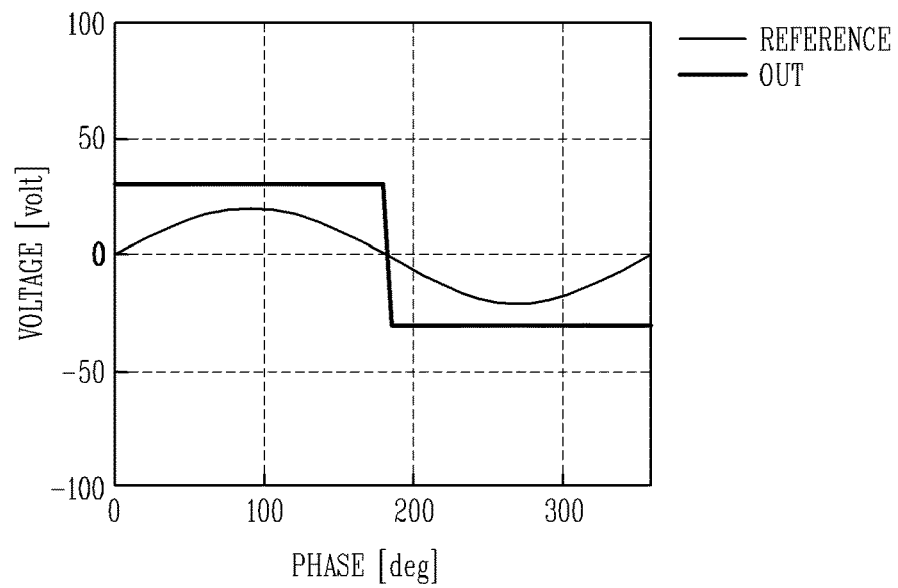
FIG. 9 is an exemplary view showing a voltage estimation waveform when a motor voltage is small in a unipolar switching mode.

FIG. 9 is an exemplary view showing a voltage estimation waveform when a motor voltage is small in a unipolar switching mode.

Figure 10:
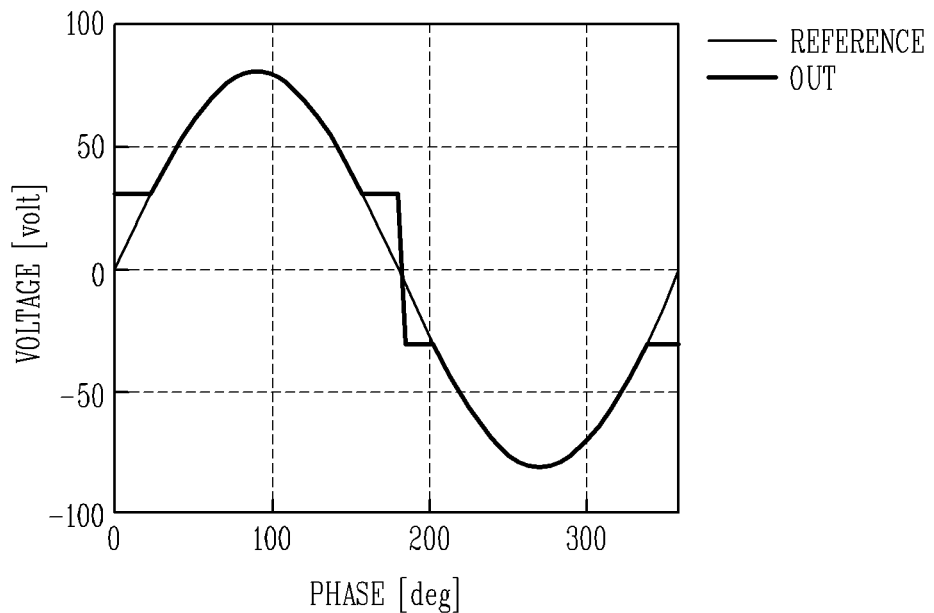
FIG. 10 is an exemplary view showing a voltage estimation waveform when a motor voltage is large in a unipolar switching mode.

FIG. 10 is an exemplary view showing a voltage estimation waveform when a motor voltage is large in a unipolar switching mode.

Figure 11:
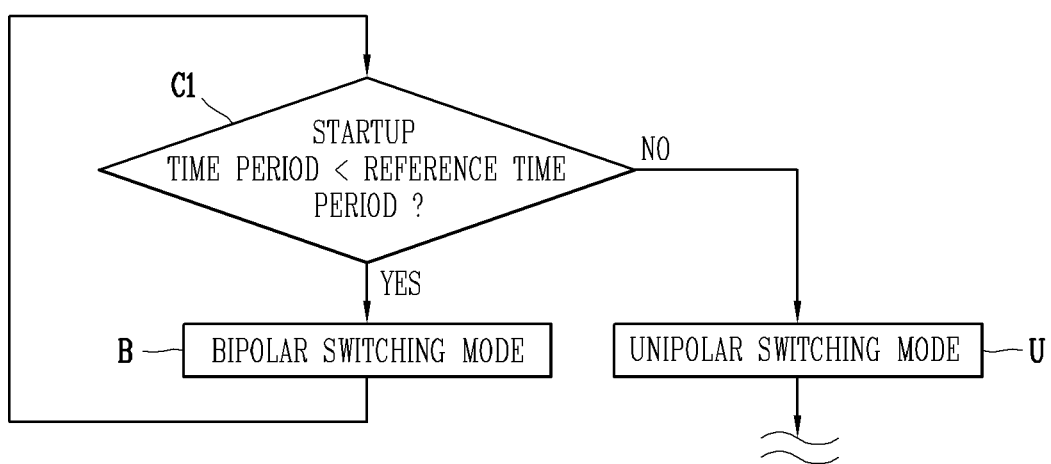
FIG. 11 is a first exemplary view showing a sequence of a specific control example of a compressor control apparatus and a compressor control method disclosed thereof disclosed herein.

FIG. 11 is a first exemplary view showing a sequence of a specific control example of a compressor control apparatus and a compressor control method disclosed thereof disclosed herein.

Figure 12:
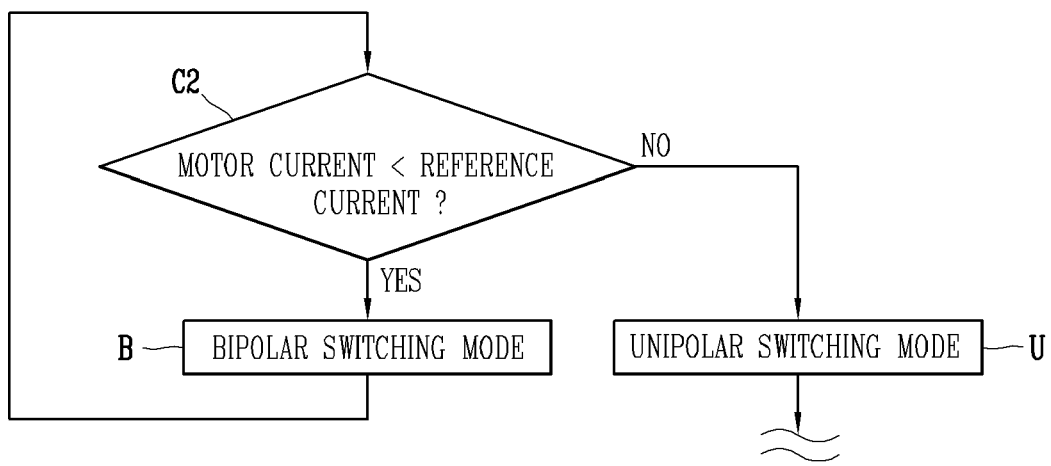
FIG. 12 is a second exemplary view showing a sequence of a specific control example of a compressor control apparatus and a compressor control method disclosed thereof disclosed herein.

FIG. 12 is a second exemplary view showing a sequence of a specific control example of a compressor control apparatus and a compressor control method disclosed thereof disclosed herein.

Figure 13:
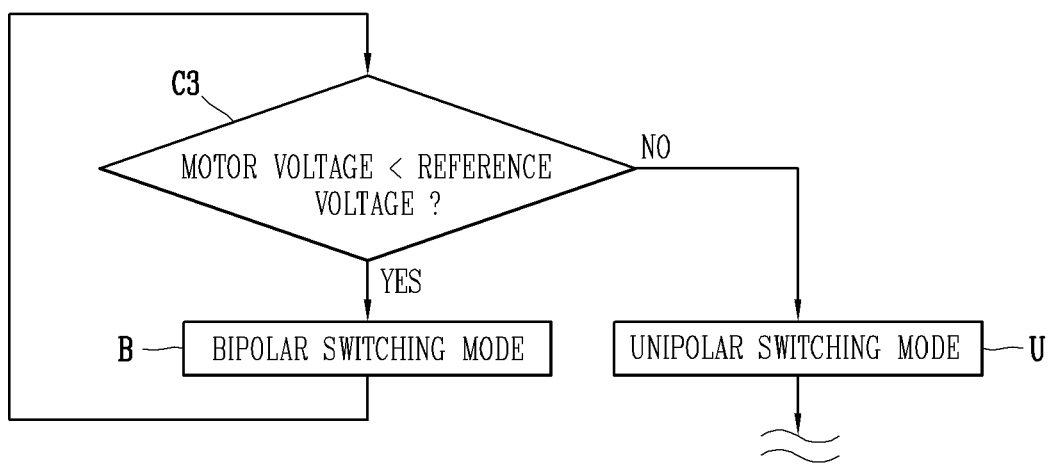
FIG. 13 is a third exemplary view showing a sequence of a specific control example of a compressor control apparatus and a compressor control method disclosed thereof disclosed herein.

FIG. 13 is a first exemplary view showing a sequence of a specific control example of a compressor control apparatus and a compressor control method disclosed thereof disclosed herein.

Figure 14:
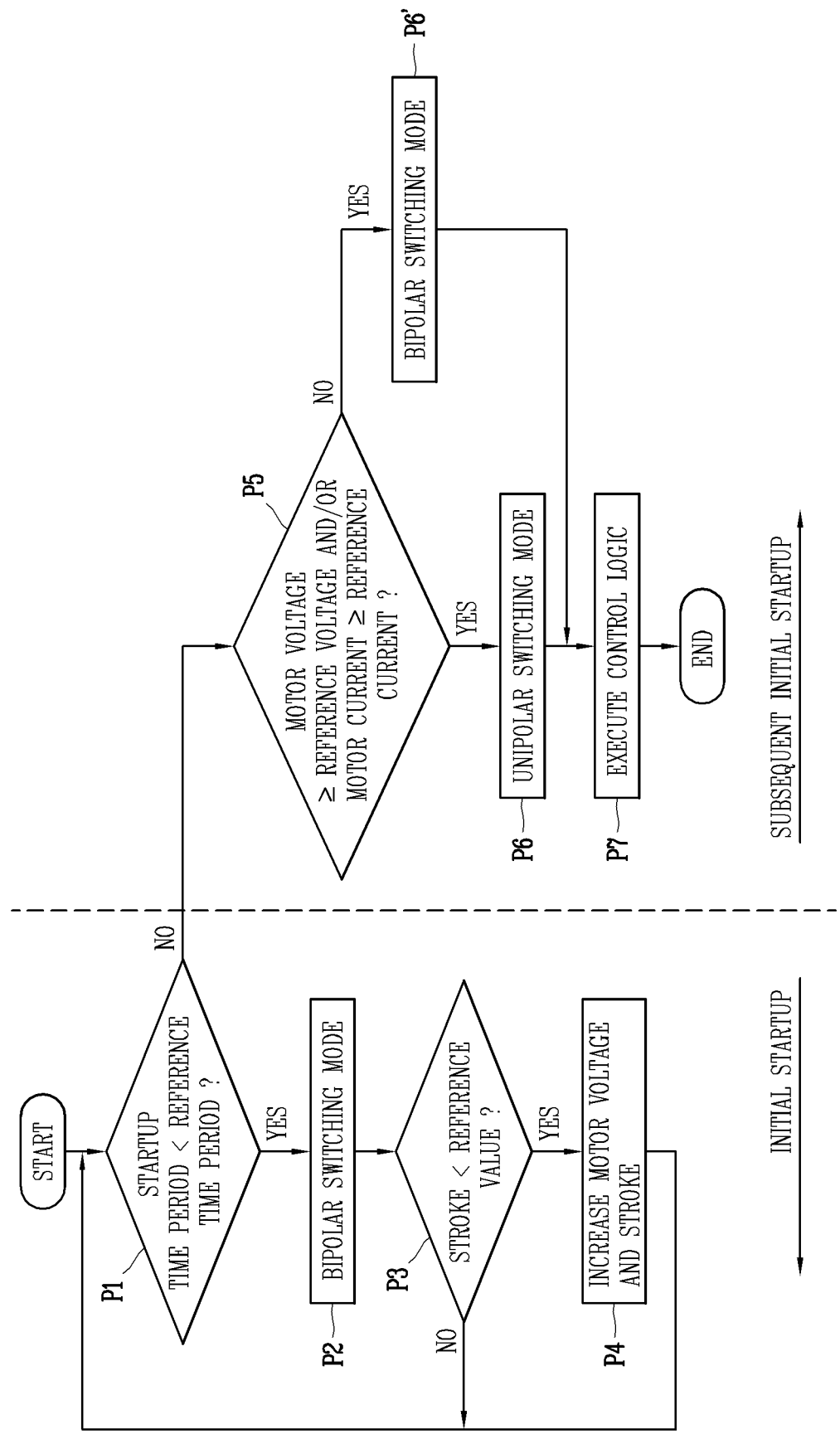
FIG. 14 is an exemplary view showing a sequence of initial start-up control according to a specific embodiment of a compressor control apparatus and a compressor control method thereof disclosed herein.

FIG. 14 is an exemplary view showing a sequence of initial start-up control according to a specific embodiment of a compressor control apparatus and a compressor control method thereof disclosed herein.

The compressor control apparatus disclosed herein may be applicable to a control apparatus for controlling a compressor, all electronic devices using a compressor, or a control apparatus thereof. For example, the compressor control apparatus may be applicable to a refrigerator, an air conditioner, or a control device thereof including a compressor. In particular, the present disclosure may be usefully applicable to a control apparatus or a control method for controlling the start-up of a motor in a compact linear compressor. However, the compressor control apparatus disclosed herein is not limited thereto, and may also be applicable to all existing compressor control apparatuses, compressor control methods, motor control apparatuses, and motor control methods to which the technical concept of the present disclosure is applicable.

The compressor control apparatus disclosed herein (hereinafter, referred to as a control apparatus) denotes a control element for controlling the motor of the compressor.

For instance, it may be an inverter apparatus for controlling the motor of the compressor.

Here, the inverter device may denote a control module embedded in the compressor or the motor or configured with a separate structure to control the motor.

The control apparatus 100 includes an input unit 110, an inverter unit 120, a sensing unit 130, and a control unit 140 as illustrated in FIG. 1 to control a motor 210 of the compressor 200.

Here, the motor 210 may be a single-phase motor.

The specific circuit configuration of the control apparatus 100 including the input unit 110, the inverter unit 120, the sensing unit 130, and the control unit 140 may be a drawing as illustrated in FIG. 2.

The input unit 110 denotes an input/output element through which power is input/output from/to the control apparatus 100.

The input unit 110 is connected to an external power source 10 to receive AC power from the external power source 10, and connected to the inverter unit 120 to supply the received power to the inverter unit 120.

The input unit 110 is connected to the external power source 10 to convert AC power input from the external power source 10 into DC power.

Here, the AC power and the DC power may denote an AC voltage and a DC voltage.

The input unit 110 may include a rectifier unit 111 for rectifying the AC power to the DC power and a smoothing unit 112 for smoothing the DC power rectified by the rectifier unit 111.

The rectifier unit 111 may be configured with a rectifier diode for rectifying AC power to DC power source, and may preferably be configured with a bridge diode.

The rectifier unit 111 is connected to the external power source 10 to receive the AC power from the external power source 10, and may rectify the received AC power to convert it into DC power.

In other words, the rectifier unit 111 may output a DC voltage at a predetermined level.

Here, a reactor (not shown) may further be provided between the external power source 10 and the rectifier unit 111.

The reactor may be formed of an inductor to limit an inrush current that can be generated from the rectifier unit 111 when the AC power is input to the rectifier unit 111.

DC power output from the rectifier unit 111 may be transferred to the smoothing unit 112.

The smoothing unit 112 may be a capacitor for smoothing and storing DC power, and preferably be a DC link capacitor.

The smoothing unit 112 may be connected to both ends of the rectifier unit 111 to smooth and store the DC power received from the rectifier unit 111.

The DC power output from the rectifier unit 112 may be transferred to the inverter unit 120.

The inverter unit 120 denotes an inverter that outputs driving power applied to the motor 210 from the control apparatus 100.

The inverter unit 120 is connected to the input unit 110 to receive power from the input unit 110, and also connected to the motor 210 to output driving power applied to the motor 210 to the motor 210.

Here, the driving power source may denote an AC voltage that drives the motor 210.

The inverter unit 120 includes a plurality of switching devices (SW1 to SW4) connected to the input unit 110 and the motor 210 to convert the DC power to the driving power and apply the driving power to the motor 210.

In other words, the inverter unit 120 may convert the DC power received from the input unit 110 to the driving power through the plurality of switching devices (SW1 to SW4), and supply the converted driving power to the motor 210.

The inverter unit 120 may include two pairs of switching devices (SW1-SW3, SW2-SW4) connected to each end of the motor 210.

The plurality of switching devices (SW1 to SW4) may be MOSFETs or an IGBTs (Insulated Gate Bipolar Transistors) that perform a switching operation by a switching control signal.

The plurality of switching devices (SW1 to SW4) are connected to both ends of the smoothing unit 112 to convert the DC power received from the smoothing unit 112 to the driving power through a switching operation, and apply the driving power to the motor 210.

Here, the driving power may be controlled through the switching operation of the plurality of switching devices (SW1 to SW4).

In other words, the driving power applied to the motor 210 may be controlled through the control of the switching operation of the plurality of switching devices (SW1 to SW4).

The switching operation of the plurality of switching devices (SW1 to SW4) may be controlled by the control unit 140.

In other words, the switching operation of the plurality of switching devices (SW1 to SW4) may be controlled by the control unit 140.

The plurality of switching devices (SW1 to SW4) may perform a switching operation by a control signal received from the control unit 140.

In other words, the plurality of switching devices (SW1 to SW4) may perform a switching operation according to the control signal received from the control unit 140, and the driving power is switched according to the switching operation to apply the driving power to the motor 210 by the control of the control unit 140.

The inverter unit 120 may apply the driving power to the motor 210 through the plurality of switching devices (SW1 to SW4) to drive the motor 210.

The sensing unit 130 denotes a sensing resistor, that is, a shunt resistor, for sensing a motor current applied to the motor 210 in the control apparatus 100.

The sensing unit 130 is connected between the input unit 110 and the inverter unit 120 to sense the motor current.

The sensing unit 130 is connected between a lower end of the smoothing unit 112 and the switches (SW3 to SW4) at a lower end of the inverter unit 120 to induce the motor current applied to the motor 210 by the inverter unit 120 so as to sense the motor current.

Here, the motor current may denote a phase current of the motor 210.

The motor current induced in the sensing unit 130 may be sensed by the control unit 140.

The control unit 140 denotes a control element that controls the operation of the inverter unit 120 in the control apparatus 100.

The control unit 140 is connected to the inverter unit 120 and the sensing unit 130 to output a control signal for controlling the operation of the inverter unit 120 to the inverter unit 120, and sense the motor current induced in the sensing unit 130.

The control unit 140 is connected to each of the plurality of switching devices (SW1 to SW4) of the inverter unit 120 and to both ends of the sensing unit 130 to control the operation of each of the plurality of switching devices (SW1 to SW4) and sense the motor current induced in the sensing unit 130.

The control unit 140 may transfer the control signal for controlling the plurality of switching devices (SW1 to SW4) to each of the plurality of switching devices (SW1 to SW4) to control the driving power so as to control the switching operation of the plurality of switching devices (SW1 to SW4) (hereinafter, referred to as a "switching device (SW)" when all of the plurality of switching devices (SW1 to SW4) are referred to, for convenience of explanation).

The control unit 140 senses the motor current from the sensing unit 130 to generate a pulse width modulation (PWM) control signal for controlling the operation of the switching device (SW) based on the sensing result, and applies the control signal to the switching device (SW) to control the operation of the switching device (SW).

Here, the control signal may be a pulse width modulation (PWM) control signal, and may denote a signal for adjusting a duty ratio of the switching device (SW) to control the switching operation.

In this manner, the control unit 140 may control the switching operation of the switching device (SW) through the control signal to convert the driving power in the switching device (SW) to be applied to the motor 210, thereby controlling the start-up of the motor 210.

In other words, the control unit 140 may control the switching operation of the switching device (SW) through the control signal to control the driving power applied to the motor 210, thereby controlling the start-up of the motor 210.

The control unit 140 that controls the switching operation of the switching device (SW) through the control signal to control the start-up of the motor 210 as described above may control the switching operation of the motor 210 in a bipolar PWM switching mode or a unipolar PWM switching mode.

Here, the bipolar switching mode denotes a mode in which the switching device (SW) is controlled to operate in a bipolar switching manner by a bipolar PWM control signal as illustrated in FIG. 3, and the unipolar switching mode denotes a mode in which the switching device (SW) is controlled to operate in a unipolar switching manner by a unipolar PWM control signal as illustrated in FIG. 4.

When the switching operation of the switching device (SW) is controlled in the bipolar switching mode, the waveform of the motor current sensed by the sensing unit 130 may be a waveform as illustrated in FIG. 5, and when the switching operation of the switching device (SW) is controlled in the unipolar switching mode, the waveform of the motor current sensed by the sensing unit 130 may be a waveform as illustrated in FIG. 6.

FIGS. 5 and 6 show the sensing waveforms of the motor current according to each of the bipolar switching mode and the unipolar switching mode in the same initial start-up state, and when the switching operation of the switching device (SW) is controlled in the bipolar switching mode, the motor current may be induced in the sensing unit 130 in a sensible amount as illustrated in FIG. 5. However, when the switching operation of the switching device (SW) is controlled in the unipolar switching mode, the motor current may be induced in the sensing unit 130 in an amount difficult to sense.

When the control unit 140 controls the switching device (SW) in the bipolar switching mode, the control unit 140 may generate the control signal as a bipolar PWM control signal as illustrated in FIG. 3 and apply the control signal to the switching device (SW), and when the switching device (SW) is controlled in the unipolar switching mode, the control unit 140 may generate the control signal as a unipolar PWM control signal as illustrated in FIG. 4 and apply the control signal to the switching device (SW).

In other words, when the switching device (SW) is controlled in the bipolar switching mode, the control unit 140 may generate the control signal as illustrated in FIG. 3 to apply the control signal to the switching device (SW), and control the switching operation of the switching device (SW) in a bipolar switching manner, and when the switching device (SW) is controlled in the unipolar switching mode, the control unit 140 may generate the control signal as illustrated in FIG. 4, to apply the control signal to the switching device (SW), and control the switching operation of the switching device (SW) in a unipolar switching manner.

The control unit 140 controls the operation of the switching device (SW) in the bipolar switching mode or the unipolar switching mode according to the start-up state of the motor 210.

The control unit 140 may control the operation of the switching device (SW) in the bipolar switching mode or the unipolar switching mode according to the start-up state of the motor 210, thereby inducing the motor current in the sensing unit 130 in a sensible amount.

When the switching operation of the switching device (SW) is controlled by the bipolar switching mode, the switching device (SW) operates in the bipolar switching manner, and thus both currents during bidirectional switching (PWM ON and PWM OFF) are induced in the sensing unit 130 as illustrated in FIG. 7, and as a result, the motor current may be sensed in a sensible amount as illustrated in FIG. 5. However, when the switching operation of the switching device is controlled in the unipolar switching mode, the switching device (SW) operates in the unipolar switching manner, and thus only a current during a unidirectional switching (PWM ON) is induced in the sensing unit 130 as illustrated in FIG. 8, and as a result, the motor current may be sensed in an amount difficult to sense as illustrated in FIG. 6.

When the sensing of the motor current is difficult, the motor current, the motor current which is a basis for generating the control signal, may not be accurately sensed, and as a result, the generation of the control signal based on control or control command according to the state of the motor 210 may not be inaccurately carried out, and thus the control of the motor 210 may be carried out in an inaccurate/unstable manner.

In other words, the control unit 140 may control the operation of the switching device (SW) in the bipolar switching mode or the unipolar switching mode according to the start-up state of the motor 210 to accurately sense the motor current in the sensing unit 130, and accordingly, the generation of the control signal for controlling the start-up of the motor 210 may be easily carried out to improve the stability and accuracy of the control of the motor 210.

The control unit 140 may control the operation of the switching device (SW) in the bipolar switching mode when the motor current is sensed in an amount difficult to sense since the driving power is low.

In other words, when the motor current is sensed in an amount difficult to sense since the driving power is low, the control unit 140 may control the operation of the switching device (SW) in the bipolar switching mode to operate the switching device (SW) in the bipolar switching manner, thereby allowing the sensing unit 130 to sense the motor current in a sensible amount.

The control unit 140 may control the operation of the switching device (SW) in the unipolar switching mode when the motor current is sensed in a sensible amount since the driving power is sufficient.

In other words, when the motor current is sensed in a sensible amount since the driving power is sufficient, the control unit 140 may control the operation of the switching device (SW) in the unipolar switching mode to operate the switching device (SW) in the unipolar switching manner, thereby reducing the switching operation of the switching device (SW) to reduce switching loss.

FIGS. 9 and 10 show a voltage estimation waveform at the time of controlling the operation of the switching device (SW) in the unipolar switching mode when the motor voltage is low and when the motor voltage is sufficient, respectively, and when the operation of the switching device (SW) is controlled in the unipolar switching mode while the motor voltage is low, the motor current may be sensed in an amount to difficult to sense, and moreover, the estimation of the voltage may not be accurately carried out as illustrated in FIG. 9 due to a minimum duty ratio value set to a control signal in the unipolar switching mode as illustrated in FIG. 4, and when the motor voltage is sufficient, the motor current may be sensed in a sensible amount even if the operation of the switching device (SW) is controlled in the unipolar switching mode, and thus the estimation of the voltage may be accurately carried out as illustrated in FIG. 10.

Accordingly, when the motor current is sensed in an amount difficult to sense since the driving power is low, the control unit 140 may control the operation of the switching device (SW) in the bipolar switching mode to sense the motor current in a sensible amount as well as to suppress the instability of voltage estimation caused by the minimum duty ratio value, and when the motor current is sensed in a sensible amount since the driving power is sufficient, the control unit 140 may control the operation of the switching device (SW) in the unipolar switching mode to reduce the switching operation of the switching device (SW) so as to reduce switching loss.

The control unit 140 that controls the operation of the switching device (SW) in the bipolar switching mode or the unipolar switching mode according to the start-up state of the motor 210 may compare a start-up time period during which start-up has been carried out from the initial start-up of the motor 210 to the present with a preset reference time period (C1) as illustrated in FIG. 11 to control the operation of the switching device (SW) in the bipolar switching mode (B) or the unipolar switching mode (U) according to a result of the comparison.

Specifically, the control unit 140 may control the operation of the switching device (SW) in the bipolar switching mode (B) when the start-up time period is less than the reference time period, and control the operation of the switching device (SW) in the unipolar switching mode (U) when the start-up time period is above the reference time period.

The control unit 140 may control the operation of the switching device (SW) in the bipolar switching mode (B) during the reference time period subsequent to the initial start-up of the motor 210.

Here, the reference time period may denote a time period required to control the operation of the switching device (SW) in the bipolar switching mode (B) during the start-up of the motor 210.

The reference time period may be an initial start-up time period during which the start-up of the motor 210 is initiated to perform the initial start-up, and for a specific example, the reference time period may be set to a time period of about 60 seconds from the time of initiating the start-up of the motor 210.

In other words, the control unit 140 may control the operation of the switching device (SW) in the bipolar switching mode (B) during the initial start-up time period of the motor 210.

At the time of initiating the start-up of the motor 210, when the operation of the switching device (SW) may be controlled in the unipolar switching mode (U), the motor voltage may be sensed in an amount difficult to sense since the motor voltage is insufficient, and thus it is required to control the motor current to be sensed in a sensible amount.

As described above, the control unit 140 controls the operation of the switching device (SW) in the bipolar switching mode (B) during the initial start-up time period subsequent to initiating the start-up of the motor 210 in which the motor voltage is insufficient, thereby sensing the motor current to be sensed in a sensible amount.

The control unit 140 may control the operation of the switching device (SW) in the unipolar switching mode (U) subsequent to the reference time period.

In other words, the control unit 140 may switch the operation of the switching device (SW) to the unipolar switching mode (U) subsequent to the completion of the initial start-up of the motor 210.

Subsequent to the completion of the initial start-up of the motor 210, the motor current may be sensed in a sensible amount even if the operation of the switching device (SW) is controlled in the unipolar switching mode (U) since the motor voltage is sufficient, and when the operation of the switching device (SW) is controlled in the bipolar switching mode (B), the loss of unnecessary switching devices in the switching device (SW) may be increased, and thus it is required to control the switching device (SW) in a manner of reducing switching loss.

As described above, the control unit 140 may control the operation of the switching device (SW) to be switched from the bipolar switching mode (B) to the unipolar switching mode (U) subsequent to the completion of the initial start-up of the motor 210 while the motor voltage is sufficient, thereby controlling the switching device (SW) in a manner of reducing switching loss.

The control unit 140 that controls the operation of the switching device (SW) in the bipolar switching mode or the unipolar switching mode according to the start-up state of the motor 210 may also compare a sensing amount of the motor current with a preset reference current (C2) as illustrated in FIG. 12 to control the operation of the switching device (SW) in the bipolar switching mode (B) or the unipolar switching mode (U) according to a result of the comparison.

Specifically, the control unit 140 may control the operation of the switching device (SW) in the bipolar switching mode (B) when the sensing amount of the motor current is less than the reference current, and control the operation of the switching device (SW) in the unipolar switching mode (U) when the sensing amount of the motor current is above the reference current.

The control unit 140 may control the operation of the switching device (SW) in the bipolar switching mode (B) when the motor current sensed by the sensing unit 130 is sensed to be less than the reference current.

Here, the reference current may denote a minimum sensing current reference at which the motor current can be accurately sensed.

In other words, the control unit 140 may control the operation of the switching device (SW) in the bipolar switching mode (B) when the motor current is sensed to be less than a minimum sensing current reference.

When the motor current is sensed to in an amount difficult to sense, it is difficult to precisely generate the control signal to reduce the stability and accuracy of control, and therefore, it is required to control the motor current to be sensed in a sensible amount.

As described above, the control unit 140 controls the operation of the switching device (SW) in the bipolar switching mode (B) when the motor current is sensed to be less than the minimum sensing current reference, thereby sensing the motor current to be sensed in a sensible amount.

The control unit 140 may control the operation of the switching device (SW) in the unipolar switching mode (U) when the motor current is sensed to be above the reference current.

In other words, the control unit 140 may control the operation of the switching device (SW) in the unipolar switching mode (U) when the motor current is sensed to be above the minimum sensing current reference.

When the motor current is sensed to be above the minimum sensing current reference, the motor current may be sensed in a sensible amount even if the operation of the switching device (SW) is controlled in the unipolar switching mode (U) since the amount of the motor current is sufficient, and when the operation of the switching device (SW) is controlled in the bipolar switching mode (B), the loss of unnecessary switching devices in the switching device (SW) may be increased, and thus it is required to control the switching device (SW) in a manner of reducing switching loss.

As described above, the control unit 140 may control the operation of the switching device (SW) to be switched from the bipolar switching mode (B) to the unipolar switching mode (U) when the motor current is sensed to be above the minimum sensing current reference, thereby controlling the switching device (SW) in a manner of reducing switching loss.

The control unit 140 may also control the operation of the switching device (SW) in the bipolar switching mode (B) when the motor current is sensed to be less than the reference current while controlling the operation of the switching device (SW) in the unipolar switching mode (U).

In other words, the control unit 140 may control the operation of the switching device (SW) to be switched from the unipolar switching mode (U) to the bipolar switching mode (B) when the motor current is reduced and sensed to be less than the reference current while controlling the operation of the switching device (SW) in the unipolar switching mode (U).

The control unit 140 that controls the operation of the switching device (SW) in the bipolar switching mode or the unipolar switching mode according to the start-up state of the motor 210 may also compare the motor voltage with a preset reference voltage (C3) as illustrated in FIG. 13 to control the operation of the switching device (SW) in the bipolar switching mode (B) or the unipolar switching mode (U) according to a result of the comparison.

Specifically, the control unit 140 may control the operation of the switching device (SW) in the bipolar switching mode (B) when the motor voltage is less than the reference voltage, and control the operation of the switching device (SW) in the unipolar switching mode (U) when the motor voltage is above the reference voltage.

The control unit 140 may control the operation of the switching device (SW) in the bipolar switching mode (B) when the motor voltage is less than the reference voltage.

Here, the reference voltage may denote a minimum voltage reference capable of maintaining the start-up of the motor 210 subsequent to the initial start-up of the motor 210, or a minimum voltage reference capable of precisely sensing the motor current.

In other words, the control unit 140 may control the operation of the switching device (SW) in the bipolar switching mode (B) when the motor voltage is sensed to be less than a minimum voltage reference.

When the motor voltage is sensed to be less than the minimum voltage reference, the motor current may be sensed to in an amount difficult to sense since the motor voltage is insufficient, it is difficult to precisely generate the control signal to reduce the stability and accuracy of control, and therefore, it is required to control the motor current to be sensed in a sensible amount.

As described above, the control unit 140 controls the operation of the switching device (SW) in the bipolar switching mode (B) when the motor voltage is less than the minimum sensing voltage reference, thereby sensing the motor current to be sensed in a sensible amount.

The control unit 140 may control the operation of the switching device (SW) in the unipolar switching mode (U) when the motor voltage is above the reference voltage.

In other words, the control unit 140 may control the operation of the switching device (SW) in the unipolar switching mode (U) when the motor voltage is above the minimum voltage reference.

When the motor voltage is sensed to be above the minimum voltage reference, the motor current may be sensed in a sensible amount even if the operation of the switching device (SW) is controlled in the unipolar switching mode (U) since the motor voltage is sufficient, and when the operation of the switching device (SW) is controlled in the bipolar switching mode (B), the loss of unnecessary switching devices in the switching device (SW) may be increased, and thus it is required to control the switching device (SW) in a manner of reducing switching loss.

As described above, the control unit 140 may control the operation of the switching device (SW) to be switched from the bipolar switching mode (B) to the unipolar switching mode (U) when the motor voltage is above the minimum voltage reference, thereby controlling the switching device (SW) in a manner of reducing switching loss.

The control unit 140 may also control the operation of the switching device (SW) in the bipolar switching mode (B) when the motor voltage is less than the reference voltage while controlling the operation of the switching device (SW) in the unipolar switching mode (U).

In other words, the control unit 140 may control the operation of the switching device (SW) to be switched from the unipolar switching mode (U) to the bipolar switching mode (B) when the motor voltage is reduced to be less than the reference voltage while controlling the operation of the switching device (SW) in the unipolar switching mode (U).

As described above, as illustrated in FIGS. 11 through 13, the control unit 140 may control the operation of the switching device (SW) in the bipolar switching mode or the unipolar switching mode based on the state of the motor 210 according to at least one of the start-up time, the motor current, and the motor voltage of the motor 210, thereby sensing the motor current in a sensible amount as well as reducing the unnecessary switching loss of the switching device (SW) until maintaining start-up subsequent to the completion of the initial start-up from the initial start-up of the motor 210.

The control unit 140 may also control the motor voltage applied to the motor 210 to increase during the reference time period subsequent to the initial start-up of the motor 210.

The control unit 140 may increase the motor voltage such that the motor voltage is controlled to increase above the reference voltage.

In other words, the control unit 140 may control the motor voltage to increase above the reference voltage during the reference time period during which the start-up of the motor 210 is initiated to perform the initial start-up of the motor 210.

The control unit 140 may control the operation of the switching device (SW) in the bipolar switching mode during the reference time period, and control the operation of the switching device (SW) to be switched from the bipolar switching mode to the unipolar switching mode subsequent to the reference time period.

In other words, the control unit 140 may control the operation of the switching device (SW) in the bipolar switching mode during the reference time period in which the initial start-up of the motor 210 is carried out, and increase the motor voltage such that the motor voltage is controlled to increase above the reference voltage, and control the operation of the switching device (SW) to be switched from the bipolar switching mode to the unipolar switching mode subsequent to the reference time period.

The control unit 140 may control the operation of the switching device (SW) to be switched from the unipolar switching mode to the bipolar switching mode when the motor voltage is less than the reference voltage subsequent to the reference time period.

In other words, when the motor voltage is less than the reference voltage while the operation of the switching device (SW) is controlled in the unipolar switching mode subsequent to the reference time period, the control unit 140 may control the operation of the switching device (SW) to be switched from the unipolar switching mode to the bipolar switching mode.

A specific application example of the control apparatus 100 according to the foregoing embodiment may be a sequence as illustrated in FIG. 14.

FIG. 14 shows an exemplary sequence of the initial start-up control of the motor 210, wherein the control apparatus 100 may control the initial start-up of the motor 210 as illustrated in FIG. 14.

As illustrated in FIG. 14, subsequent to initiating the start-up of the motor 210, the control apparatus 100 may compare the start-up time period with the reference time period (P1), and control the operation of the switching device (SW) in the bipolar switching mode (P2) when the start-up time period is less than the reference time period, that is, corresponds to the initial start-up period of the motor 210 as a result of the comparison.

Then, the stroke of the compressor (200) may be compared with a reference value (P3), and as a result of the comparison, when the stroke is less than the reference value, the motor voltage and the stroke may be increased (P4), and when the stroke is above the reference value, the start-up time period may be compared with the reference time period to determine whether or not the motor 210 is initially started.

When the start-up time period is above the reference time period as a result of comparing the start-up time period and the reference time period (P1), that is, when the initial start-up of the motor 210 is completed, the motor voltage and the reference voltage may be compared or the motor current and the reference current may be compared (P5) to control the operation of the switching device (SW) in the unipolar switching mode or the bipolar switching mode according to the comparison result (P6 or P6').

The motor voltage may be compared with the reference voltage or the motor current may be compared with the reference current (P5), and the operation of the switching device (SW) may be controlled in a unipolar switching mode (P6) when the motor voltage is above the reference voltage or the motor current is above the reference current as a result of the comparison, and the operation of the switching device (SW) may be controlled in a bipolar switching mode (P6') when the motor voltage is less than the reference voltage or the motor current is less than the reference current, and thereafter, the motor 210 may be controlled (P7) according to prestored control logic.

[Compressor Control Method]

Hereinafter, an embodiment of the compressor control method of the compressor control apparatus disclosed herein will be described with reference to FIG. 15, and a portion overlapping with those described in the [compressor control apparatus] will be omitted as much as possible, and only a portion necessary for explaining the embodiment of the control method will be described by quoting them again.

Figure 15:
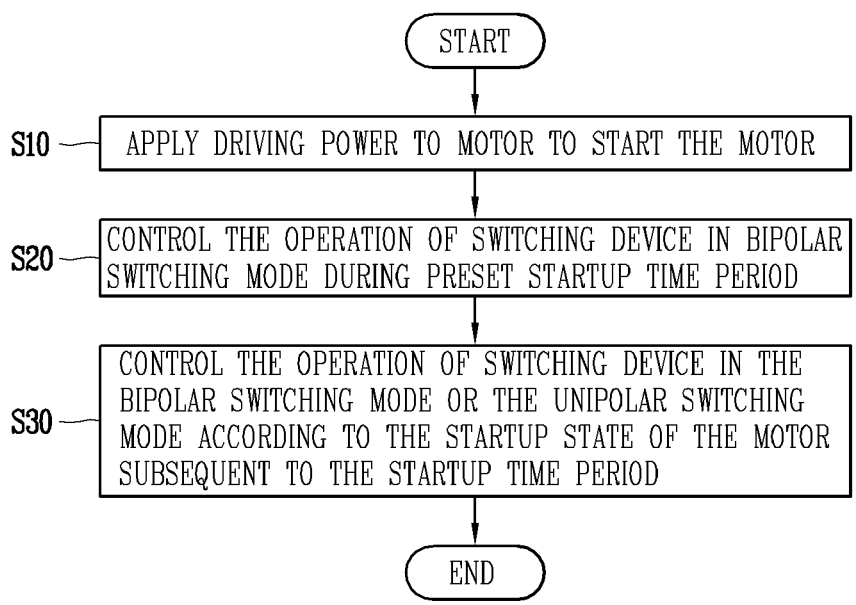
FIG. 15 is a flowchart showing a procedure of a compressor control method of a compressor control apparatus disclosed herein.

FIG. 15 is a flowchart showing a procedure of a compressor control method of a compressor control apparatus disclosed herein.

The compressor control method of the compressor control apparatus disclosed herein may be applicable to a control apparatus for controlling a compressor, all electronic devices using a compressor and a control apparatus thereof, or a control method thereof. For example, the present disclosure may be applicable to a refrigerator, an air conditioner, or a control apparatus thereof or a control method thereof. In particular, the present disclosure may be usefully applicable to a control apparatus or a control method for controlling the start-up of a motor in a compact linear compressor. However, a control method of the compressor control apparatus disclosed herein is not limited thereto, and may also be applicable to all existing compressor control apparatuses, compressor control methods, motor control apparatuses, and motor control methods to which the technical concept of the present disclosure is applicable.

The control method of the compressor control apparatus disclosed herein (hereinafter, referred to as a control method) denotes a control method for controlling the motor of the compressor.

For instance, it may be a control method of an inverter apparatus for controlling the motor of the compressor.

Here, the inverter device may denote a control module embedded in the compressor or the motor or configured with a separate structure to control the motor.

As illustrated in FIG. 1 or 2, the control method, which is a control method of the compressor apparatus 100 including an input unit 110 configured to convert AC power input from the external power supply 10 to DC power, an inverter unit 120 provided with a plurality of switching devices (SW1 to SW4) to convert the DC power to driving power so as to apply the driving power to the motor of the compressor 200, a sensing unit configured to sense a motor current applied to the motor 210, and a control unit 140 configured to sense the motor current from the sensing unit 130 and control the operation of the motor 210 based on the sensing result to control the start-up of the motor 210, is applied to the compressor control apparatus 100.

In other words, the control apparatus 100 to which the control method is applied may be the control apparatus 100 described above.

The control method may be a method of controlling the initial start-up of the motor 210.

As illustrated in FIG. 15, the control method may include applying the driving power to start the motor 210 (S10), controlling the operation of the motor (210) in a bipolar PWM switching mode during a preset reference time period (S20), and controlling the operation of the switching device (SW) in the bipolar PWM switching mode or the unipolar PWM switching mode according to the start-up state of the motor 210 subsequent to the reference time period.

The control method may be performed by the control unit 140 of the control apparatus 100.

A specific initial start-up control application example of the control method may be carried out in a sequence as illustrated in FIG. 14.

The process of controlling the operation in the bipolar switching mode (S20) may be a process (P1 to P4) corresponding to the initial start-up control of the motor 210.

The process of controlling the operation in the bipolar switching mode (S20) may compare the start-up time period of the motor 210 with the reference time period, as illustrated in FIG. 11, to control the operation of the switching device (SW) in the bipolar switching mode (B) until the start-up time period exceeds the reference time period (P1 to P4).

The process of controlling the operation in the bipolar switching mode (S20) may increase a motor voltage applied to the motor during the reference time period.

In other words, the process of controlling the operation in the bipolar switching mode (S20) may increase a motor voltage applied to the motor 210 while controlling the operation of the switching device (SW) in the bipolar switching mode (B) during the reference time period.

The reference time period is a period of time required to control the operation of the switching device (SW) in the bipolar switching mode (B) during the start-up of the motor 210, and for instance, may be an initial start-up time period during which the start-up of the motor 210 is initiated (S10) to perform the initial start-up.

The process of controlling the operation in the bipolar switching mode (S20) may increase the motor voltage applied to the motor 210 until the voltage exceeds the reference voltage during the reference time period.

The process of controlling the operation in the bipolar switching mode (S20) may also increase the stroke of the compressor 200 until exceeding a reference value during the reference time period.

The process of controlling the operation in the unipolar switching mode (S30) may be a process (P5 to P7) corresponding to control subsequent to the initial start-up control of the motor 210, that is, subsequent to the completion of the initial start-up.

The process of controlling the operation in the unipolar switching mode (S30) may compare the motor current with a preset reference current or compare the motor voltage with a preset reference voltage, and control the operation of the switching device (SW) in the bipolar switching mode (B) or the unipolar switching mode (U) according to a result of the comparison to execute control logic for controlling the motor 210.

As illustrated in FIG. 12, the process of controlling the operation in the unipolar switching mode (S30) may compare the motor current sensed by the sensing unit 130 with the reference current to control the operation of the switching device (SW) in the bipolar switching mode (B) or the unipolar switching mode (U) according to a result of the comparison.

The reference current may denote a minimum sensing current reference at which the motor current can be accurately sensed.

The process of controlling the operation in the unipolar switching mode (S30) may maintain and control the operation of the switching device (SW) in the bipolar switching mode (B) when the motor current is less than the reference current.

In other words, the process of controlling the operation in the unipolar switching mode (S30) may maintain and control the operation of the switching device (SW) in the bipolar switching mode to sense the motor current in a sensible amount when the motor current is less than the minimum sensing current reference subsequent to the start-up time period, that is, subsequent to the completion of the initial start-up of the motor 210.

The process of controlling the operation in the unipolar switching mode (S30) may switch the operation of the switching device (SW) to the unipolar switching mode (U) when the motor current is above the reference current.

In other words, the process of controlling the operation in the unipolar switching mode (S30) may switch the operation of the switching device (SW) from the bipolar switching mode (B) to the unipolar switching mode (U) to reduce the switching loss of the switching device (SW) when the motor current is above the minimum sensing current reference subsequent to the start-up time period, that is, subsequent to the completion of the initial start-up of the motor 210.

The process of controlling the operation in the unipolar switching mode (S30) may switch the operation of the switching device (SW) to the bipolar switching mode (B) when the motor current is sensed to be less than the reference current while controlling the operation of the switching device (SW) in the unipolar switching mode (U).

As illustrated in FIG. 13, the process of controlling the operation in the unipolar switching mode (S30) may compare the motor voltage applied to the motor 210 with the reference voltage to control the operation of the switching device (SW) in the bipolar switching mode (B) or the unipolar switching mode (U) according to a result of the comparison.

The reference voltage may denote a minimum voltage reference capable of maintaining the start-up of the motor 210 subsequent to the initial start-up of the motor 210, or a minimum voltage reference capable of precisely sensing the motor current.

The process of controlling the operation in the unipolar switching mode (S30) may maintain and control the operation of the switching device (SW) in the bipolar switching mode (B) when the motor voltage is less than the reference voltage.

In other words, the process of controlling the operation in the unipolar switching mode (S30) may maintain and control the operation of the switching device (SW) in the bipolar switching mode to sense the motor current in a sensible amount when the motor voltage is less than the minimum sensing voltage reference subsequent to the start-up time period, that is, subsequent to the completion of the initial start-up of the motor 210.

The process of controlling the operation in the unipolar switching mode (S30) may switch the operation of the switching device (SW) to the unipolar switching mode (U) when the motor voltage is above the reference voltage.

In other words, the process of controlling the operation in the unipolar switching mode (S30) may switch the operation of the switching device (SW) from the bipolar switching mode (B) to the unipolar switching mode (U) to reduce the switching loss of the switching device (SW) when the motor voltage is above the minimum sensing voltage reference subsequent to the start-up time period, that is, subsequent to the completion of the initial start-up of the motor 210.

The process of controlling the operation in the unipolar switching mode (S30) may switch the operation of the switching device (SW) to the bipolar switching mode (B) when the motor voltage is less than the reference voltage while controlling the operation of the switching device (SW) in the unipolar switching mode (U).

A compressor control apparatus and a compressor control method thereof disclosed herein as described above may control the switching operation of the switching device in a bipolar switching mode or a unipolar switching mode according to the start-up state of the motor, thereby appropriately and efficiently performing the operation control of the switching device.

In particular, the operation of the switching device may be controlled in a bipolar switching mode during initial start-up of the motor to sense motor current in a sensible amount, thereby accurately and easily performing the sensing of the motor current even during the initial start-up.

Accordingly, it may be possible to ensure stability and reliability during start-up control while at the same time accurately sensing the motor current throughout the motor control so as to precisely perform the control of the motor, and control the operation of the switching device in the bipolar switching mode during the initial start-up of the motor so as to improve the restriction of the voltage instability according to the setting of the minimum duty ratio of the PWM control signal for controlling the inverter, and control the operation of the switching device in the unipolar switching mode subsequent to the completion of the initial start-up of the motor so as to reduce unnecessary switching loss due to the switching operation of the switching device.

As a result, a compressor control apparatus and a compressor control method thereof disclosed herein may expect the above-described effects through the embodiments as described above, and solve the problems of the present disclosure.

The embodiments of a compressor control apparatus and a compressor control method thereof disclosed herein may be implemented in part or a combination of the components or steps included in the foregoing embodiments or may be implemented in a combination of the foregoing embodiments, and it should be noted that technological terms used herein are merely used to describe a specific embodiment, but are not intended to limit the spirit of technologies disclosed herein.

The embodiments of a compressor control apparatus and a compressor control method thereof disclosed herein may be applicable individually or in combination to all compressor control apparatuses, compressor control methods, motor control apparatuses, and motor control methods in the related art to which the technical spirit of the present disclosure is applicable.

The foregoing preferred embodiments of the present disclosure are disclosed to solve technical tasks, and it will be apparent to those skilled in this art that various modifications, variations and additions can be made thereto without departing from the spirit and scope of the present disclosure. Those modifications and the like should be construed to be included in the following claims.

What is the claimed is:

1. A compressor control apparatus configured to control a compressor, the compressor control apparatus comprising:
   an input unit connected to an external power source and configured to convert alternating current (AC) power input from the external power source into direct current (DC) power, the input unit comprising a smoothing device configured to reduce variation of the DC power;
   a motor that is a single phase motor;
   an inverter unit comprising two pairs of switching devices that are connected to ends of the smoothing device of the input unit and to the motor, that are configured to convert the DC power received from the smoothing device to driving power through a switching operation, and that are configured to apply the driving power to the motor;
   a sensing unit connected between the input unit and the inverter unit and configured to sense a motor current applied to the motor; and
   a control unit configured to:
     receive the motor current sensed by the sensing unit,
     based on the motor current, generate a pulse width modulation (PWM) control signal for controlling operation of the switching devices, and
     apply the PWM control signal to the switching devices to control operation of the switching devices,
   wherein the control unit is further configured to:
     based on the motor current at a start-up of the motor, control operation of the switching devices (i) in a bipolar PWM switching mode in which the PWM control signal is configured to change between a plurality of polarities or (ii) in a unipolar PWM switching mode in which the PWM control signal is configured to change between zero and one of the plurality of polarities,
     during a reference time period subsequent to the start-up of the motor, increase a motor voltage applied to the motor and control operation of the switching devices in the bipolar PWM switching mode,
     subsequent to the reference time period, switch operation of the switching devices from the bipolar PWM switching mode to the unipolar PWM switching mode, and
     based on the motor voltage being less than a reference voltage subsequent to the reference time period, switch operation of the switching devices from the unipolar PWM switching mode to the bipolar PWM switching mode.

2. The compressor control apparatus of claim 1, wherein the control unit is further configured to, based on the motor current being less than a reference current, control operation of the switching devices in the bipolar PWM switching mode.

3. The compressor control apparatus of claim 2, wherein the control unit is further configured to, based on the motor current being greater than or equal to the reference current, control operation of the switching devices in the unipolar PWM switching mode.

4. The compressor control apparatus of claim 1, wherein the control unit is further configured to, based on the motor voltage being greater than or equal to the reference voltage, control operation of the switching devices in the unipolar PWM switching mode.

5. A method of controlling a compressor control apparatus configured to control a compressor, the compressor control apparatus including an input unit configured to convert alternating current (AC) power input from an external power source into direct current (DC) power, the input unit including a smoothing device configured to reduce variation of the DC power, a motor that is a single phase motor, an inverter unit including two pairs of switching devices that are connected to ends of the smoothing device of the input unit and to the motor, that are configured to convert the DC power received from the smoothing device to driving power through a switching operation, and that are configured to apply the driving power to the motor, a sensing unit configured to sense a motor current applied to the motor, and a control unit configured to receive the motor current sensed by the sensing unit, generate a pulse width modulation (PWM) control signal for controlling operation of the switching devices, and control operation of the switching devices by the PWM control signal based on the motor current at a start-up of the motor, the method comprising:
   applying the driving power to the motor to start the motor;
   during a reference time period subsequent to the start-up of the motor, controlling operation of the switching devices in a bipolar PWM switching mode in which the PWM control signal is configured to change between a plurality of polarities; and
   subsequent to the reference time period, controlling operation of the switching devices based on the motor current at the start-up of the motor (i) in the bipolar PWM switching mode or (ii) in a unipolar PWM switching mode in which the PWM control signal is configured to change between zero and one of the plurality of polarities,
   wherein controlling operation in the bipolar PWM switching mode comprises:

during the reference time period subsequent to the start-up of the motor, increasing a motor voltage applied to the motor.

6. The method of claim 5, wherein controlling operation of the switching devices in the bipolar PWM switching mode or in the unipolar PWM switching mode comprises:
comparing the motor current sensed by the sensing unit with a reference current; and
based on a result of the comparison of the motor current with the reference current, controlling operation of the switching devices in the bipolar PWM switching mode or in the unipolar PWM switching mode.

7. The method of claim 6, wherein controlling operation of the switching devices in the bipolar PWM switching mode or in the unipolar PWM switching mode comprises:
based on the motor current being less than the reference current, maintaining operation of the switching devices in the bipolar PWM switching mode.

8. The method of claim 6, wherein controlling operation of the switching devices in the bipolar PWM switching mode or in the unipolar PWM switching mode comprises:
based on the motor current being greater than or equal to the reference current, switching operation of the switching devices from the bipolar PWM switching mode to the unipolar PWM switching mode.

9. The method of claim 8, wherein controlling operation of the switching devices in the bipolar PWM switching mode or in the unipolar PWM switching mode comprises:
based on the motor current being less than the reference current in a state of controlling operation of the switching devices in the unipolar PWM switching mode, switching operation of the switching devices from the unipolar PWM switching mode to the bipolar PWM switching mode.

10. The method of claim 5, wherein controlling operation of the switching devices in the bipolar PWM switching mode or in the unipolar PWM switching mode comprises:
comparing the motor voltage applied to the motor with a reference voltage; and
based on a result of the comparison of the motor voltage to the reference voltage, controlling operation of the switching devices in the bipolar PWM switching mode or the unipolar PWM switching mode.

11. The method of claim 10, wherein controlling operation of the switching devices in the bipolar PWM switching mode or in the unipolar PWM switching mode comprises:
based on the motor voltage being less than the reference voltage, maintaining operation of the switching devices in the bipolar PWM switching mode.

12. The method of claim 10, wherein controlling operation of the switching devices in the bipolar PWM switching mode or in the unipolar PWM switching mode comprises:
based on the motor voltage being greater than or equal to the reference voltage, switching operation of the switching devices from the bipolar PWM switching mode to the unipolar PWM switching mode.

13. The method of claim 12, wherein controlling operation of the switching devices in the bipolar PWM switching mode or in the unipolar PWM switching mode comprises:
based on the motor voltage being less than the reference voltage in a state of controlling operation of the switching devices in the unipolar PWM switching mode, switching operation of the switching devices from the unipolar PWM switching mode to the bipolar PWM switching mode.

\* \* \* \* \*